(12) United States Patent
Markman et al.

(10) Patent No.: US 12,001,784 B1
(45) Date of Patent: Jun. 4, 2024

(54) SYSTEMS AND METHODS FOR PROVIDING A COLLABORATIVE DOCUMENT ENVIRONMENT

(71) Applicant: Google LLC, Mountain View, CA (US)

(72) Inventors: Kevin Markman, New York, NY (US); Kevin Winter, Metuchen, NJ (US); Luiz Do Amaral De Franca Pereira Filho, Jersey City, NJ (US); Yunchi Luo, East Amherst, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/733,959

(22) Filed: Apr. 29, 2022

Related U.S. Application Data

(63) Continuation of application No. 17/671,528, filed on Feb. 14, 2022, which is a continuation of application No. 15/793,868, filed on Oct. 25, 2017, now Pat. No. 11,250,210, which is a continuation of application No. 14/749,326, filed on Jun. 24, 2015, now Pat. No. 9,817,805.

(60) Provisional application No. 62/061,889, filed on Oct. 9, 2014, provisional application No. 62/016,349, filed on Jun. 24, 2014, provisional application No. 62/016,282, filed on Jun. 24, 2014, provisional application No. 62/016,275, filed on Jun. 24, 2014.

(51) Int. Cl.
| | | |
|---|---|---|
| *G06F 17/00* | (2019.01) | |
| *G06F 40/103* | (2020.01) | |
| *G06F 40/169* | (2020.01) | |
| *G06F 40/197* | (2020.01) | |
| *G06Q 10/10* | (2023.01) | |
| *G06Q 10/101* | (2023.01) | |
| *H04L 67/10* | (2022.01) | |

(52) U.S. Cl.
CPC .......... *G06F 40/197* (2020.01); *G06F 40/103* (2020.01); *G06F 40/169* (2020.01); *G06Q 10/101* (2013.01); *G06Q 10/103* (2013.01); *H04L 67/10* (2013.01)

(58) Field of Classification Search
CPC .... G06F 40/197; G06F 40/103; G06F 40/169; G06Q 10/101; G06Q 10/103; H04L 67/10
See application file for complete search history.

(56) References Cited

U.S. PATENT DOCUMENTS

| | | | |
|---|---|---|---|
| 7,222,156 B2 | 5/2007 | Gupta et al. | |
| 7,370,060 B2 * | 5/2008 | Jain | ........................ G06F 40/123 |
| | | | 707/999.102 |
| 8,108,464 B1 * | 1/2012 | Rochelle | .................. H04L 51/00 |
| | | | 709/204 |
| 8,473,847 B2 | 6/2013 | Glover | |
| 8,682,989 B2 | 3/2014 | Meisels et al. | |
| 8,869,046 B2 | 10/2014 | Brown et al. | |

(Continued)

*Primary Examiner* — Mohammed H Zuberi
(74) *Attorney, Agent, or Firm* — Lowenstein Sandler LLP

(57) ABSTRACT

Systems and methods are disclosed for sharing a unified undo/redo stack between multiple applications. A method determining that a host application receives an action regarding a document, adding the action to a unified stack that is associated with undo commands and is shared between the host application and a secondary application, receiving an undo command from the host application or the secondary application, and retrieving the undo command from the unified stack to cause the action to be undone in the host application and the secondary application.

22 Claims, 7 Drawing Sheets

(56) References Cited

U.S. PATENT DOCUMENTS

| | | | |
|---|---|---|---|
| 9,053,079 B2* | 6/2015 | Bailor | G06F 16/93 |
| 9,208,137 B2* | 12/2015 | Ginetti | G06F 40/166 |
| D754,168 S | 4/2016 | Vazquez et al. | |
| 9,329,762 B1* | 5/2016 | Schultz | G06F 3/04845 |
| 9,383,888 B2 | 7/2016 | Fish et al. | |
| 9,479,605 B2 | 10/2016 | Kleppner et al. | |
| 9,552,340 B2 | 1/2017 | Marsh | |
| 9,607,278 B2 | 3/2017 | Zaveri | |
| 9,948,988 B2* | 4/2018 | Findlay | H04N 21/4788 |
| 10,025,759 B2 | 7/2018 | Mulder | |
| 10,067,927 B2 | 9/2018 | Myerscough et al. | |
| 10,225,291 B2 | 3/2019 | Wilde et al. | |
| 2002/0091768 A1 | 7/2002 | Balasubramanian | |
| 2004/0172377 A1 | 9/2004 | Saitou et al. | |
| 2007/0061382 A1* | 3/2007 | Davis | G06F 16/80 |
| 2007/0271502 A1* | 11/2007 | Bedi | G06F 40/186 |
| | | | 715/255 |
| 2010/0281362 A1* | 11/2010 | Bailor | G06F 40/166 |
| | | | 715/256 |
| 2010/0313158 A1 | 12/2010 | Lee et al. | |
| 2011/0296507 A1* | 12/2011 | Khosrowshahi | G06F 16/93 |
| | | | 715/810 |
| 2012/0036456 A1* | 2/2012 | Grunberger | G06F 16/955 |
| | | | 715/760 |
| 2012/0136862 A1 | 5/2012 | Glover | |
| 2012/0166282 A1 | 6/2012 | Reis et al. | |
| 2012/0166540 A1 | 6/2012 | Reis et al. | |
| 2012/0278401 A1 | 11/2012 | Meisels et al. | |
| 2012/0284344 A1 | 11/2012 | Costenaro et al. | |
| 2012/0284618 A1 | 11/2012 | Bailor et al. | |
| 2013/0151940 A1* | 6/2013 | Bailor | G06F 11/1464 |
| | | | 715/229 |
| 2013/0275885 A1 | 10/2013 | Spataro et al. | |
| 2014/0019585 A1 | 1/2014 | Mshnubhatla et al. | |
| 2014/0033088 A1 | 1/2014 | Shaver | |
| 2014/0149857 A1* | 5/2014 | Vagell | G06F 40/169 |
| | | | 715/255 |
| 2014/0289645 A1 | 9/2014 | Megiddo et al. | |
| 2014/0310345 A1 | 10/2014 | Megiddo et al. | |
| 2014/0372855 A1 | 12/2014 | Myerscough et al. | |
| 2015/0186350 A1 | 7/2015 | Hicks | |
| 2015/0269146 A1 | 9/2015 | Ayyar et al. | |
| 2016/0321227 A1 | 11/2016 | Keslin et al. | |
| 2016/0357720 A1 | 12/2016 | Thimbleby | |
| 2016/0378725 A1 | 12/2016 | Marchsreiter | |

* cited by examiner

SYSTEMS AND METHODS FOR PROVIDING A COLLABORATIVE DOCUMENT ENVIRONMENT

CROSS-REFERENCE TO RELATED APPLICATION

This application is a continuation application of U.S. patent application Ser. No. 17/671,528, filed Feb. 14, 2022, which is a continuation application of U.S. patent application Ser. No. 15/793,868, filed Oct. 25, 2017, now U.S. Pat. No. 11,250,210, which is a continuation application of U.S. patent application Ser. No. 14/749,326, filed on Jun. 24, 2015, now U.S. Pat. No. 9,817,805, which claims priority to U.S. Provisional Patent Application No. 62/016,275, filed Jun. 24, 2014, U.S. Provisional Patent Application No. 62/016,282, filed Jun. 24, 2014, U.S. Provisional Patent Application No. 62/016,349, filed Jun. 24, 2014, U.S. Provisional Patent Application No. 62/061,889, filed Oct. 9, 2014, each of which is incorporated herein by reference.

TECHNICAL FIELD

In general, this disclosure relates to electronic documents, in particular, to systems and methods for providing a collaborative document environment.

BACKGROUND

During development of an electronic document, it is often desirable to have multiple reviewers propose changes to and comment on a draft of the electronic document. For example, an author may create an initial draft of an electronic document and send a copy of the electronic document to multiple reviewers for comments. Each reviewer may independently propose changes or make comments in the electronic document and return a revised version of the electronic document back to the author. These steps may be repeated until the author and the reviewers are satisfied with a version of the electronic document. However, this process is time consuming and inefficient.

SUMMARY

Systems and methods are disclosed for providing a summary of suggested changes made to an electronic document. A suggested change is iteratively selected from a first list of suggested changes. A second list of modified suggested changes is generated by processing each selected suggested change in the first list of suggested changes. The processing comprises marking the selected suggested change for including or excluding in the summary, based on a first determination of whether to include or exclude the selected suggested change in the summary. If the selected suggested change is marked for including in the summary, the processing further comprises at least one of combining the selected suggested change with a previously processed suggested change to form one of the modified suggested changes for including in the second list, based on a second determination of whether to combine the selected suggested change with the previously processed suggested change, and truncating the selected suggested change to form one of the modified suggested changes for including in the second list, based on a third determination of whether to truncate the selected suggested change. The second list of modified suggested changes is provided as the summary of suggested changes.

Another aspect relates to a system including means for providing a summary of suggested changes made to an electronic document. The system includes means for iteratively selecting a suggested change from a first list of suggested changes, and means for generating a second list of modified suggested changes by processing each selected suggested change in the first list of suggested changes. The means for generating comprises means for marking the selected suggested change for including or excluding in the summary, based on a first determination of whether to include or exclude the selected suggested change in the summary. If the selected suggested change is marked for including in the summary, the means for generating further comprises at least one of means for combining the selected suggested change with a previously processed suggested change to form one of the modified suggested changes for including in the second list, based on a second determination of whether to combine the selected suggested change with the previously processed suggested change, and means for truncating the selected suggested change to form one of the modified suggested changes for including in the second list, based on a third determination of whether to truncate the selected suggested change. The system further includes means to provide the second list of modified suggested changes as the summary of suggested changes.

In some implementations, the selected suggested change is marked for excluding from the summary when the selected suggested change includes a styling or formatting modification to a portion of the electronic document. In some implementations, the selected suggested change is combined with the previously processed suggested change when the selected suggested change corresponds to a same type of modification to a similar portion of the electronic document as the previously processed suggested change. The selected suggested change may correspond to a first portion of the electronic document, the previously processed suggested change may correspond to a second portion of the electronic document, and the first portion is adjacent to the second portion. The selected suggested change and the previously processed suggested change may each correspond to an addition of at least one space, and the addition of the selected suggested change is adjacent to the addition of the previously processed suggested change.

In some implementations, the selected suggested change is truncated by removing formatting or styling modifications associated with the selected suggested change. In some implementations, the selected suggested change corresponds to an addition or a deletion of a portion of the electronic document, and the selected suggested change is truncated by removing at least some of the portion of the electronic document, such that the formed modified suggested change includes only a part of the portion. The at least some of the portion of the electronic document that is removed may include a section of whitespace within the selected suggested change.

In some implementations, the second list of modified suggested changes is provided as the summary of suggested changes in response to a request from a user of the electronic document to view a revision history of the electronic document. The system may further include means for providing the second list of modified suggested changes as the summary of suggested changes in a notification message that is transmitted to the user to notify the user of the suggested changes to the electronic document.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the systems and methods described herein, certain embodiments will now be described, including a system and method for providing a collaborative document environment. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

Figure 1:
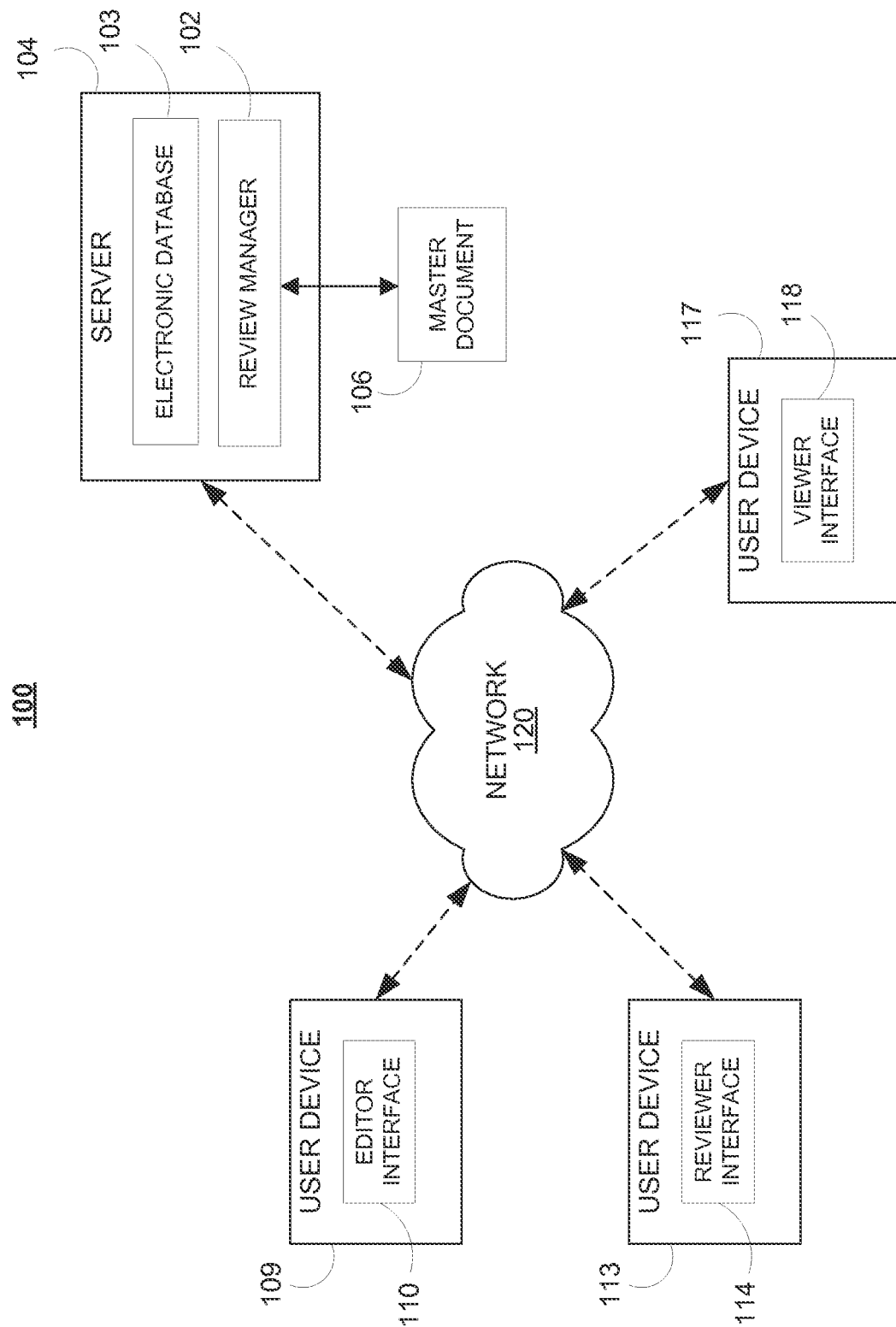
FIG. 1 is a block diagram of a computerized system for integrating collaboratively proposed changes and publishing an electronic document, according to an illustrative implementation.

FIG. 1 is a diagram of a computerized system 100 for providing a collaborative document environment, according to an illustrative embodiment. System 100 includes a server 104 and three user devices 109, 113, and 117 connected over a network 120. The server 104 includes an electronic database 103 and a review manager 102, which manages updates to various versions of a master document 106. The master document 106 may be stored on the electronic database 103 on the server 104, or in a separate storage device.

To make the process of collaborating on electronic documents more efficient, a collaborative document editing environment is provided for integrating collaboratively proposed changes of an electronic document. In the collaborative document editing environment, users at different user devices may simultaneously access the master document 106 to review the document and propose changes. Each user is associated with a user type (such as an editor, a reviewer, or a viewer for example), which defines a level of authority for access to and editing capabilities of various versions of the document. As is shown in FIG. 1, an editor at the user device 109 may interact with the master document 106 over the editor interface 110, a reviewer at the user device 113 may interact with the master document 106 over the reviewer interface 114, and a viewer at the user device 117 may interact with the master document 106 over the viewer interface 118.

A reviewer of a document may view, make suggested edits, and provide comments on the document, but may not have permission to accept or reject any of the suggested edits. The reviewer may further view suggested edits and comments provided by other reviewers of the document. An editor has a greater level of authority for the document than the reviewer, and may accept or reject any suggested edit, and may also delete any comments made by the reviewer. Moreover, the editor also has access to make direct changes to the document by directly editing or making comments on the document. The edits received from an editor may be treated as accepted edits. A viewer of the document has a lower level of authority than the reviewer, and may only view a clean published version of the document, not including any indication of the suggested edits or comments. In an example, when an editor views the document, the editor may view a live stream of collaborative updates made by multiple reviewers at the same time, significantly reducing the amount of time to develop the document. In this manner, by allowing for efficient collaboration across a set of users proposing changes to a document, the systems and methods disclosed herein offer significant advantages over a system in which reviewers independently propose changes to a document.

The present disclosure describes four exemplary embodiments, each of which involve a back end implementation system and method to address problems that arise in the above-described collaborative document editing environment. In a first exemplary embodiment of the present disclosure, a system and method are described that produces a description of changes or suggested changes that are made to a document. In particular, it may be desirable to omit certain changes from the description of changes, and/or to shorten or truncate the description of some changes that are included. In this way, rather than having a description that includes all of the information related to all changes that have been made to the document, the description summary includes only a short description of those changes that are deemed to be relevant to the document and therefore most useful to the user. In a second exemplary embodiment of the present disclosure, a system and method are described that reuses a framework created for the suggested edits environment for a different purpose, such as to produce the description summary related to the first exemplary embodiment for displaying a revision history to a user, and/or for sending a notification of changes made to the document to a user. In a third exemplary embodiment of the present disclosure, a system and method are described that uses a hash method determines whether to allow a user to undo a deletion of a comment when the comment has subcomments, or replies to the comment. In a fourth exemplary embodiment of the present disclosure, a system and method are described that uses a unified undo/redo stack across multiple applications, such that a user who may select, from one application, to undo or redo a previous action implemented in another application.

In a first exemplary embodiment of the present disclosure, the systems and methods described herein provide a way to produce a description of changes made to a document, which may be referred to herein as model diff descriptions. In a document model that has been annotated to record specific changes that have been suggested by different users, it is often non-trivial to explain what changes have been made to a user. In particular, internal details and model redundancy can make it difficult to summarize the changes and providing a useful level of detail. User interface treatments to distinguish suggested changes can sometimes obscure the entirety of the change, making it important to have a textual summary of the change.

Existing systems may display a summary of the changes that were made to a document. However, such summaries are verbatim descriptions of each individual change. The first exemplary embodiment of the present disclosure improves upon such systems by processing a document model and determining appropriate localized text to display for that change. In particular, this includes handling not only suggested insertion of plain text but also images, table of contents, drawings, tables, bookmarks, lists, redefining headings style, headers and footers, footnotes, document level properties such as margins, whitespace as well as formatting changes of text in the document.

Several features may be implemented to make the summary of the changes to the document more concise. In particular, the view of the summary may display the entirety of additions and deletions (where deletions may have a strikethrough) so the summary of the changes only contains the most relevant piece of information. Large snippets of text may be truncated and displayed with one or more ellipses to indicate there is more text visible in the document.

Figure 2:
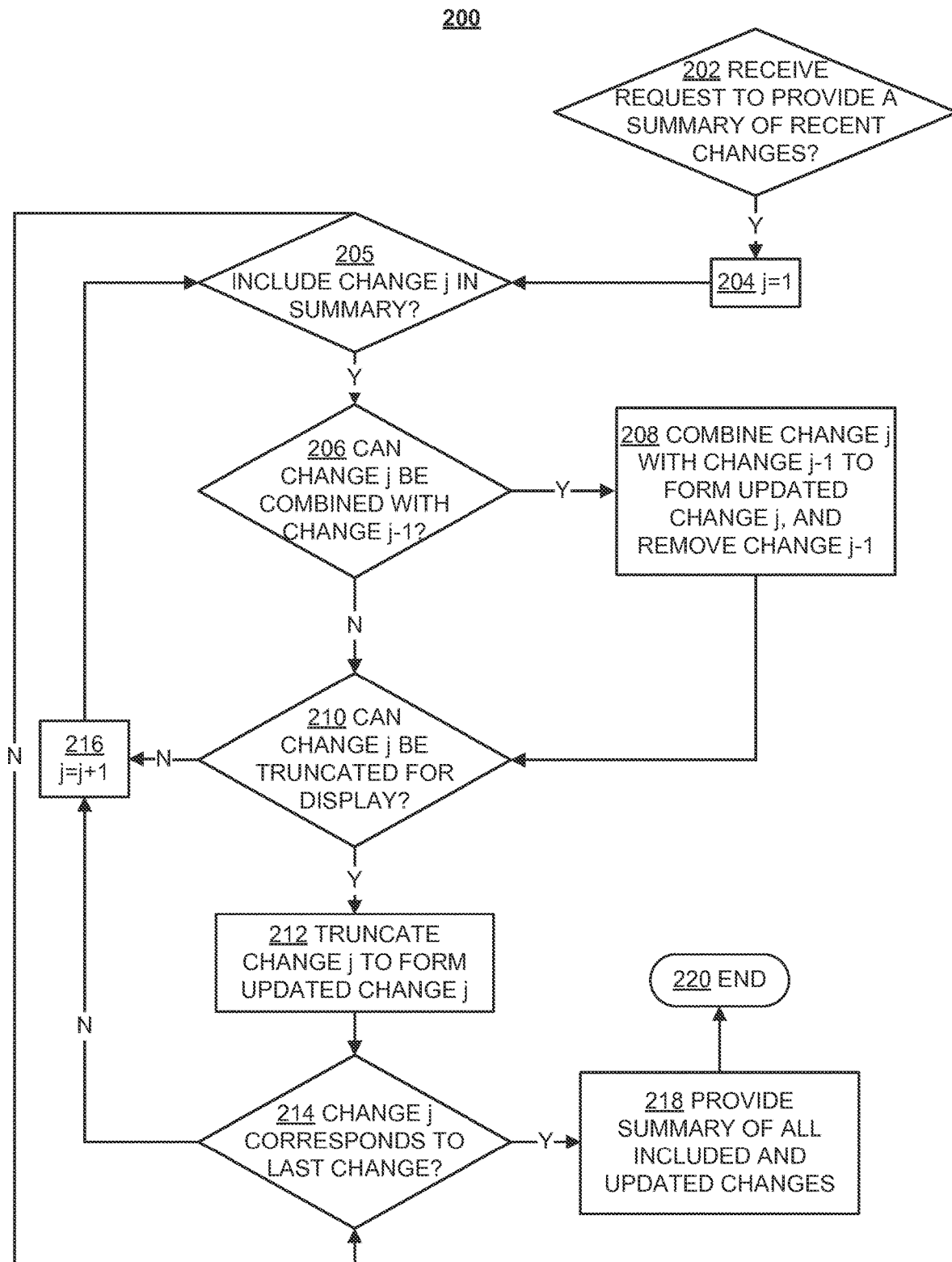
FIG. 2 is a flow chart of a method for generating a description of changes made to a document, according to an illustrative implementation.

FIG. 2 is a flowchart of a method 200 used by the review manager 102 to manage requests to provide a summary of recent changes to a document. The method 200 includes the steps of receiving a request to provide a summary of recent changes (decision block 202), initializing a change iteration parameter j to 1 (step 204), and determining whether to include the j-th change in the summary (decision block 205). If the j-th change is to be included, the method 200 proceeds to determine whether the j-th change can be combined with the j-1-th change (decision block 206), and if so, combines the two changes to form an updated j-th change and remove the j-1-th change (step 208). If the review manager 102 determines that the j-th change can be truncated for display purposes (decision block 210), the j-th change is truncated to form an updated j-th change (step 212). If the j-th change does not correspond to the last change (decision block 214), the change iteration parameter j is incremented (step 216), and the method returns to decision block 205 to determine whether to include the next change in the summary. When all changes have been considered and optionally combined and/or truncated, the summary of all included and updated changes is provided (step 218) and the method 200 ends (step 220).

At decision block 205, the review manager 102 determines whether to include the j-th change in the summary. The j-th change may be omitted from the summary if the review manager determines that the j-th change is minor enough that its presence in the summary is unnecessary or undesirable. For example, it may be undesirable to include any styling that occurs within suggested insertions/deletions in the summary because such styling changes are minor compared to more substantive changes, such as the actual content that is suggested to be inserted or deleted. Similarly, formatting changes may likewise be omitted from the summary.

If the review manager 102 determines that the j-th change should be included in the summary, the method 200 proceeds to decision block 206 to determine whether the j-th change can be combined with the j-1-th change. The review manager 102 may determine to combine the j-th change with the previous j-1-th change if both changes are of the same type of change. In some implementations, suggested whitespace is broken down into its different elements to make it easier to display. For example, if the j-th change corresponds to the addition of a space, and the j-1-th change also corresponds to the addition of a space, then these two changes may be combined at step 208 to form an updated j-th change that corresponds to the addition of two spaces. In this case, the j-1-th change may be removed so that the j-1-th change and the updated j-th change are not both included in the summary. In general, any number of changes may be combined into a single updated change.

At decision block 210, the review manager 102 determines whether the j-th change (or updated j-th change from step 208) can be truncated for display in the summary, and at step 212, those changes that can be truncated are truncated to form updated changes. In some implementations, suggested insertions that contain regular text mixed with objects such as pictures or tables may only display the first portion of text inserted, omitting any mention of any objects. In some implementations, the insertion of many objects is handled concisely. For example, if a collaborator inserts a set of pictures with newlines separating the pictures, the summary may display:

Add: image (4 times)
Add: paragraph (5 times)

Moreover, the addition of paragraph content and whitespace may also be handled concisely. In an example, if a user adds three paragraphs and a page break, the summary may display:

Add: paragraph (3 times)
Add: page break

The logic that generates the summary may process each part of the document model that was modified by a given suggestion, but may only include the most relevant pieces. For example, if a collaborator suggests the paragraph be center aligned, the alignment would be mentioned in the summary, as the alignment may be excluded at decision block 205. However, if the collaborator suggests adding a paragraph and then decides it should also be center aligned and have the line spacing changes, only the text of the paragraph may be included in the summary, as the styling is secondary to the textual content.

At decision block 214, the review manager 102 determines whether the j-th change corresponds to the last change under consideration. If there are more changes to consider, the method 200 proceeds to step 216 to increment j and decision block 205 to determine whether to include the j-th change in the summary. When all changes have been considered, the method 200 proceeds to step 218 to provide the summary of all updated changes that are determined to be included in the summary. These updated changes may include any combination of combined changes (as formed at step 208) and truncated changes (as formed at step 212).

The approach of the first exemplary embodiment of the present disclosure balances providing verbose detail when the change is small (such as changing the margin on a drawing, for example), versus providing just the text added when a big block of content including text as well as an image with its margin adjusted.

By only displaying a short snippet of what was added/deleted, an editor of a document may quickly process a large number of suggestions. The short snippet provides plenty of information for small suggestions and gives the editor enough information to get a sense of what was changed and decide if the editor needs to read the entire change or not. The whitespace and object (i.e., image) handling may group several changes made in the same area of the document together with a succinct quote describing the change.

The first exemplary embodiment of the present disclosure provides several advantages. For example, the summaries described herein are easy for an editor to skim through and make good use of screen real estate. Rather than displaying change summary bubbles that take up an entire side of a screen display, the editor may quickly skim through a list of these to decide which ones to look at first. Moreover, the editor has detailed information for small edits, while the superfluous details when the suggested change is very large may be omitted. The summary described herein scales down to small formatting tweaks and up to large chunks of content, whether typed or pasted by a collaborator.

In some implementations, an overly detailed summary is generated. The smaller details may be suppressed (i.e., by being excluded at decision block 205, being truncated at step 212, and/or being combined at step 208) in favor of larger changes, unless the editor explicitly requests the more detailed view. For example, if the collaborator adds a paragraph with three links inside it, the summary may include "Add: [paragraph text]" with a visual indicator (i.e. such a plus symbol) indicating there were other changes that could be described, letting the user click it to display the more detailed changes.

As used herein, a "diffsummary" refers to a textual explanation of a suggested change. For example, if a suggester bolds a word, the diffsummary may reflect: "Format: bold". If the suggester corrects a misspelling, the diffsummary may reflect: "Replace "missspelling" with "misspelling". These diffsummaries may be displayed in a comment anchored to the range in the document corresponding to the suggested edit. The diffsummaries may also included in email notifications informing editors and subscribed users that a suggestion has been made (batched with comments).

In some implementations, the syntax for a summary of the changes may follow a certain format. For example, the following list includes various styles of summaries.

Add OBJECT TYPE
Add: "some user content"
Add OBJECT TYPE: with text "some user content"
Delete OBJECT TYPE
Delete: "some user content"
Delete OBJECT TYPE: with text "some user content"
Replace OBJECT_TYPE
Replace: "foo" with "bar"
Replace OBJECT_TYPE: "foo" with "bar"
Format OBJECT_TYPE: property1, property2, property3
  Some basic rules may apply. First, actions include Add, Delete, Replace and Format. Action and object type may always be bolded. Type may always be included, except for paragraph and text, which may be special cases to be omitted. Format may be used to handle all entity/style properties. Entity tether changes may be handled as Format: position. In particular, a special "position" property may be used to indicate an entity's position is changed. This may be beneficial in that features that use both properties and entities may end up with a single diffsummary entry describing all the changes made. When many properties have been modified (an example rule of thumb is n>4), a catchall "style" property may be used, rather than listing out all the modified properties.

Summaries of the changes made to an electronic document may be generated in the collaborative document editing application and sent to a comment system for storage. When a comment for a suggestion is displayed next to the range in the document, the system may use rendering logic provided by the collaborative document editing application. The comment system may send notifications to document owners and users subscribed to notifications. These notifications may batch up all comments/suggestions sent in a period of time. The logic for this may again be provided by the collaborative document editing application.

The reviewer manager 102 may generate the summaries of changes made to an electronic document by using a generator function. The generator may register one or more builder providers, each of which may handle a different feature, such as a builder that creates a list of the changes, or a builder that creates a table of the changes. The generator may use the builder providers to instantiate a new builder instance for a specific model and suggestion id combination. The builder providers may be stateful. The generator may iterate through the document model to identify all the inserted and deleted spacers, all applied styles, and all entities modified by this suggestion. The generator may process all portions of the affected model in a predefined order. Styles and entities tethered inside spacers that have been suggested for deletion or insertion may be excluded to ensure the summaries are succinct (at decision block 205, for example). For each change in the model, the generator may query each of the builders (for example, in order of registration, with the default one last) to handle the suggestion. Once a builder has handled (e.g., processed) the change, the generator proceeds to the next change in the model (at step 216, for example, where the change iteration parameter j is incremented). Once all the model changes have all been processed by builders (at decision block 214, for example), the generator asks each builder to construct a summary of the builder's handled changes.

The generator may then merge all the instances provided by the builders, incrementing the count where necessary. Due to size limitations available in storage, portions of the summary may be dropped or removed when the size of the summary would exceed an estimated maximum size. In practice, due to truncated user content, this may not happen.

In some implementations, a "suggest edit" function, which wraps all edits made in suggest changes mode, may use the generator to construct the summary for each suggestion with which the suggested edit is associated. The collaborative document editing application may provide functions to serialize the client side classes into a format understood by the comments system, which may then serialize the data and store the data on the server.

In some implementations, the summaries of changes that are generated according to the method 200 are stored in a format suitable for storing in a comments system, which may be stored in a cloud storage system that replicates data across multiple datacenters. An extension may be defined to the cloud comments system to store the suggested changes.

In some implementations, the rendering logic that is responsible for generating the summaries of changes may be provided to the comments system from the collaborative document editing application, with logic added to deserialize the comments system format into the client classes. This transforms the object into a format that is suitable for injecting into the comment body. Style properties may be stored as enumerated types (enums) and may be transformed into human readable names.

In some implementations, styles may also be treated differently from content objects, which may store their own type. In some implementations, a type may not be stored in the style change object, such that the render phase may determine how to handle style properties. In an example, text and paragraph properties may be stored in the same entry, despite being in two different style types. Text and paragraph properties may be stored as separate types, causing the type to be determined during the render phase. However, such an implementation may be unnecessary and undesirable to embed this logic in the render phase, and the merging logic may be moved to the builder.

In some implementations, aside from the logic to map properties to their style type and the separate step of transforming the property enum into its localized text value, the rest of the summary may be rendered completely via a templating system for dynamically generating HTML in JAVA, JAVASCRIPT, or both. The base templating system may handle adding the basic verbiage for the summaries of changes, mostly translated types and user provided values into messages than can be translated/localized properly with support for plurals. Two separate templates may be used to wrap the base template to allow outputting in either html (for both html emails and the comment bodies in the collaborative document editing application) or plain text output for plain text email bodies in the comments notification.

In some implementations, a listening function may listen for events, which may occur any time a comment or reply is created, updated, or deleted. The events may be processed, and a notification payload may be created (if the circumstances warrant notifying). A notifier may then package the notification payload and sends it a messaging system, which receives the payload and adds it to a bucket of (document, recipient). The bucket may be held for a configurable amount of time (e.g., such as 5 minutes if the document is closed, 15 minutes if the document is open by the user to be notified). As more comments or replies are added or updated, they get added to the same bucket of (document, recipient). When the time period has passed, the messaging system takes all the payloads in a given bucket and sends this to a message processor configured to process the bucket. The message processor passes the bucket to an event processor, which processes the notification events, filters out events that should not be sent, groups the events by comment id, and translates the events into HTML and text message bodies.

In some implementations, the templating system described herein for both the formatting of the summaries of changes and property localization may be reused between the JAVA and JAVASCRIPT implementations of rendering of the summaries of changes.

In a second exemplary embodiment of the present disclosure, the systems and methods described herein provide a way to reuse a suggested edits framework. A document editor may allow users to make edits as suggestions, which may be tracked and are accepted or rejected before being incorporated into the document. Such a framework for suggested edits can be reused for related purposes, including generation of a revision history for a document (e.g., a summary of changes made to the document, as described in relation to the first exemplary embodiment and FIG. 2), transmitting change notifications of a document, or both.

In a first example of a reuse of the suggested edits framework, generation of a revision history involves determining an efficient way to provide to a user data indicative of which user(s) created which modifications to a file. Such data may include having a base version of the file at a particular time, and a visual markup of any subsequent changes to the file. These visual highlights may include strikethroughs for deletions, different colored text for additions, comments in a sidebar that indicate formatting changes, or any other suitable indication of a modification to a file or document. In a second example of a reuse of the suggested edits framework, change notifications are messages that are sent to collaborators (such as users that have access to a particular file). The change notifications may be in the form of emails or other messages that visually and/or textually describe a given set of changes.

The second exemplary embodiment of the present disclosure involves reusing a suggested edits framework to power other features of an application. In particular, the suggested edits framework may involve generating an internal non-localized data structure (that may persist for later use in other features of an application) based on a model and a list of changes to a file or document. Then, the persisted data structure may be used to generate a localized textual representation of the change. This textual representation of the change may be used in the suggested edits framework to provide indications of the suggested edits to different users of a document. A flexible mechanism is provided that may be used for multiple purposes, including a suggested edits framework, a revision history, and change notification system. Any or all of the three use cases (suggested edits, revision history, and change notifications) may involve the steps shown and described in relation to FIG. 3.

The annotated model described above may be used for applying suggested changes to a document and/or for generation of a revision history. Furthermore, the intermediary data structure described above may be modified or localized into the language of the viewer or recipient for applying suggest changes to a document, generation of a revision history, transmitting change notifications, or any suitable combination thereof.

It may be generally desirable to use text to describe the changes to a document made by users in a collaborative document editing environment. In a suggest changes environment, a textual description of the changes to a document is useful, and an annotated model may be used to represent the changes. The textual description and the annotated model may be reused for one or more other features within the suggest changes environment. In one example, when a revision history is generated, an annotated model that includes snippets describing the changes would make the revision history accessible. In another example, when change notifications are transmitted, the annotated model may not be necessary, but a textual description of the document changes would be sent in message form to the owner or subscriber of a document. When the suggest changes environment is designed, it may be desirable to use an approach that considers these other features such that similar features do not need to be built multiple times. Instead, the flexible approach described herein recognizes that similar features may share several desirable characteristics, and the implementation of these characteristics may be reused in multiple features. In some embodiments, the textual representation of a change to a document is localized and descriptive, such that a user may understand the change and its context without necessarily viewing the document or its raw data.

Figure 3:
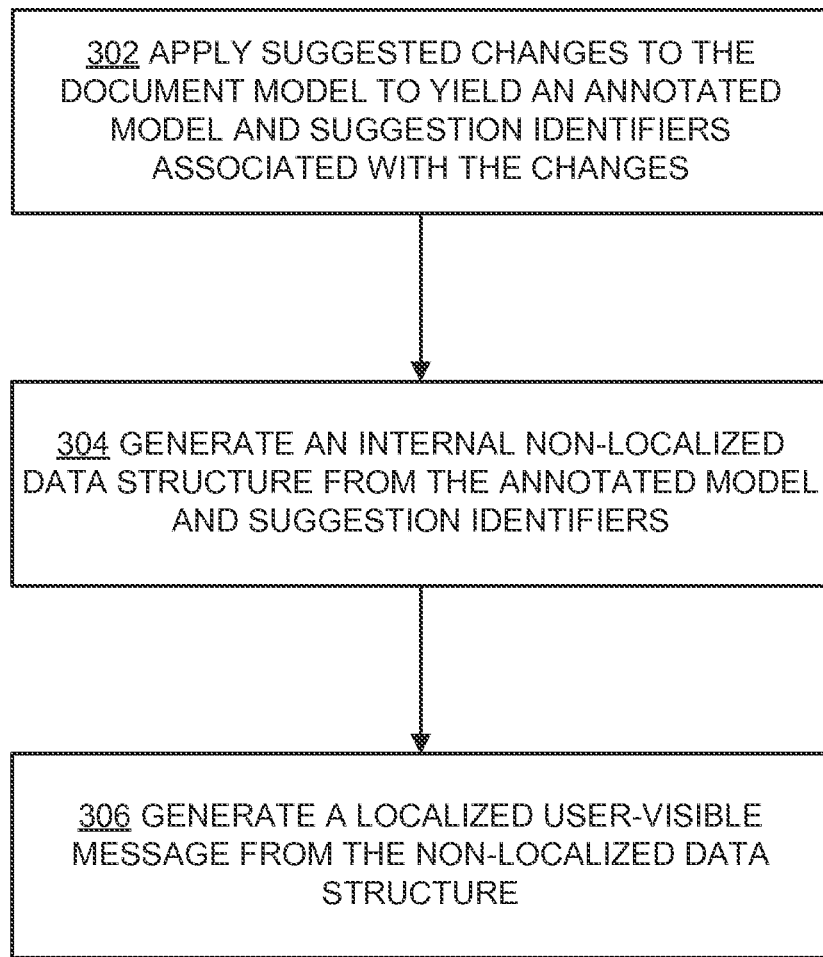
FIG. 3 is a flow chart of a method for reusing a suggested edits framework in a separate application, according to an illustrative implementation.

FIG. 3 is a flowchart of a method 300 used by the review manager 102 to perform any of the following functions: provide a suggest changes environment, generate a revision history, and transmit a change notification, according to an illustrative embodiment of the present disclosure. The method 300 includes the steps of applying the suggested changes to a document model, yielding an annotated model and suggestion identifiers associated with the changes (step 302), generating an internal non-localized data structure from the annotated model and the suggestion identifiers (step 304), and generating a localized HTML, text, or other user-visible message from the non-localized data structure (step 306). In some embodiments, the annotated model that is generated at step 302 may be used in the suggest changes environment and in revision history generation, and the intermediary data structure that is generated at step 304 may be later localized into the language of the recipient for suggest changes, revision history generation, and change notification transmission.

At step 302, suggested changes may be applied to the document model, yielding an annotated model and suggestion identifiers associated with the changes. The original author may make additional changes to the model at this step and the annotations will be retained.

At step 304, the internal non-localized data structure may be generated from the annotated model and the suggestion identifiers. As used herein, the non-localized data structure is sometimes referred to as a "protocol buffer object," which refers to an instance of a "protocol buffer." While the non-localized data structure may be a protocol buffer object, a protocol buffer may not be necessary to implement the features described herein. In general, any suitable non-localized data structure may be used for the protocol buffer object.

In some embodiments, a command may be used in place of the protocol buffer object to store a representation of a change. As used herein, a "command" includes an action that may be applied to a model, such as a portion of the model to modify and one or more values that may be used during the modification of the model. In one example, a command indicates an insertion of the text "Beautiful" at index 6 for a model including "Hello World!". Applying the command to the model results in a new modified model including "Hello Beautiful World!". In this manner, user changes to an electronic document may be represented with a large number of commands. In another example, pasting a paragraph from the internet may involve a first command to insert the text, and several additional commands to update the styling of the inserted paragraph (such as the font style, the font size, or adding links to the paragraph, for example). In this case, the first command may be combined with the additional styling commands to form a single suggestion. One distinction between the uses of the protocol buffer object and the command is that the protocol buffer object causes smaller changes to be combined into a single group, while a command represents just one of those changes in the user's action.

Using a command may be advantageous at least because commands already describe a delta (e.g., a set of one or more changes) made to a document model, and there is not necessarily any additional storage burden when adding new styles or commands. However, a protocol buffer object may not be strictly represented with a delta. In particular, a protocol buffer object may also convey user action (such as insertion of a table, for example). Moreover, the use of commands implies that any arbitrary list or ordering of the commands is valid, which may add unnecessary complexity. Furthermore, it may not be possible to use commands to succinctly represent changes. For example, two commands may be required to represent a change that includes an added section as well as the text or data that is in the added section. In particular, HTML generation may be needed to be used to combine the two commands to represent a single change. For these reasons, it may be desirable to use a protocol buffer object instead of a command to represent changes.

The data stored in the protocol buffer object may contain information that is specific to the relevant application. For example, tables may be represented differently in different applications. Storing different types of objects may lead to a large data structure or HTML generation layer that is specific to many products in the same set of code. To resolve this, a product-specific protocol buffer object and a product-specific HTML generation layer may be implemented to offer flexibility from product to product.

To reuse code, encapsulation may be used. In particular, a protocol buffer object for one application may encapsulate the protocol buffer object for another application to represent the changes within a document. Likewise, two or more applications may reuse the same code for HTML generation. In this manner, the existing code and logic to support the suggest changes environment may be leveraged to implement other features.

In a collaborative document editing environment, protocol buffer object generation for change notifications may be generated. In particular, change commands related to a document may be converted to suggestions of the document. Command ownership and suggestion identifiers are determined from the user who makes the change, and the ownership and suggestion identifiers may be tracked as changes are made to the document. In an example, if the change that is part of the change notification is a suggested change, the suggestion identifier of the suggested change may be rewritten with a special prefix that indicates to the protocol buffer object generation logic that the change is a suggestion, and a data bit in the protocol buffer object may be used to indicate whether the change is a suggestion.

At step 306, a localized user-visible message is generated from the non-localized data structure. In particular, the localized user-visible message may include a localized textual representation of the change, and may include HTML or text formats. This message can be displayed in context with the change, allowing reviewers to compare the localized user-visible message with the document content. The message may also be used in change notifications.

In some embodiments, the generation of a revision history (e.g., the generation of a summary of changes made to a document, as is described in the first exemplary embodiment of the present disclosure) reuses the suggest edit framework to apply all changes as suggested changes to a document model, resulting in an annotated model. The annotated model may be queried to generate a protocol buffer object by reusing the same logic as used for the suggest changes environment. Moreover, any improvements to the suggest changes environment may be leveraged for the view of the revision history.

In some embodiments, the suggest changes environment may be accessible to all people (e.g., ally). For example, for users who are visually impaired, the suggested changes may be verbalized. Suggestion protocol buffer objects may not be used at a command level to describe changes to a document model for the purpose of adding ally to areas that are currently not accessible.

In some embodiments, it may be desirable to distinguish an edit that pastes a section of text from an edit that types out a section of text. In this case, metadata associated with the edit may be made available in the suggest changes environment and passed onto the protocol buffer object generation logic. The metadata may be incorporated into the protocol buffer object as needed in an aggregated fashion. In some embodiments, all the edit metadata associated with a suggestion may be aggregated together. Over the course of multiple edits, it may not be possible to directly tell which edit metadata was responsible for a particular portion of the suggested change. In this case, the implementation of merging may require that the changes are saved as different suggestions.

In some embodiments, some product applications may use the suggest changes framework to generate protocol buffer objects, while other product applications may generate protocol buffer objects directly from metadata associated with their own applications.

In some embodiments, the protocol buffer object used in the collaborative document editing environment may use any combination of the following data structures. As examples, the data structures may include structures for replacement of content (e.g., the deletion of some content and the addition of content adjacent to the deleted content), deletion of content, addition of content, style change of content, changes to a picture or drawing, formatting changes (e.g., changing margin sizes or borders), or any suitable combination thereof. For the addition and deletion structures, each structure may include a field for the content that was added or deleted, as well as the number of times that this content was added to or deleted from the document model. The replacement structure may include a field for the content added, the content deleted, and the number of times this was performed. For the formatting structure, fields may include a type of entity that is changed (e.g., an image or drawing) and the properties that were modified in the change. For the style structure, the fields may include a type of the style that is changed and its properties that were modified (e.g., font styles). Any structure that uses a content field may further include entries for any plain text that is part of the content, and an enumeration value that indicates a location of the plain text (e.g., whether it is in a table, and if so, which row and/or column or a particular section of the electronic document.

In some embodiments, the collaborative document editing environment generates a protocol buffer object by using suggest changes as an intermediary, whether it be from revision history, change notifications, or suggest changes itself. Once the changes have been applied to the model as suggestions, the following process may take a suggestion identifier and text model as input and return a protocol buffer object as output. A design that includes a pluggable builder of a summary of a document's changes may be implemented per feature (or group or related feature) to handle the different changes in the model. On feature initialization, a provider may be registered with a registry, which may be implemented by a generator. When the generator provided with a model and suggestion identifier, the generator may ask the providers to provide a builder for the given model and the suggestion identifier. For each suggestion, the generator may ask the builders in turn to add that change. Builders may store internal metadata to allow them to merge discontinuous suggestions as needed as well as record duplicate suggestions.

This process may be implemented using the following steps. First, an empty processed rangelist R and an processed entity set S are initialized. For each deletion, insertion, and style change, the sections may be split. In particular, large ranges of adjacent deletions, insertions, and style changes may be broken up into multiple sections based on their content. For example, when a user adds both a header and a footer to a document, these additions may be stored adjacently within the document model. However, the review manager 102 recognizes that the header and footer should be treated as two different insertions rather than a single insertion. One way to split such large ranges of adjacent changes is to use a marker or a special character (or another suitable annotation) that indicates the beginning of a new section. Moreover, each deletion may be added to R. Each processed range R is subtracted from each insertion, and after the remaining insertion is processed, the result is added to R. Each style change may include a step that also subtracts each processed range R from the style change. In some implementations, entities within the document model may be tethered, or associated with, a particular paragraph, index, or location within the document. For example, an image may be positioned within the document by tying the image relative to a paragraph, rather than having the image occur in line with textual content. In this case, the image may be tethered to a paragraph marker. A deleted entity that has a tether location not associated with ranges that have already been processed (e.g., not yet processed, or is not "tethered in R") is then processed as a deleted entity. The processed entity is then added to S. Added entities are examined to determine whether any are not tethered in R and not in S. If so, then the added entities are processed, and the processed added entities are added into S. Similarly, entity states with suggested updates and suggested tethers are examined to determine whether any are not tethered in R and not in S, before being processed. To process these items, a set of builders may be configured to aggregate metadata associated with these items and provide processed additions, deletions, replacements, style changes, and entity changes. The content stored in this processed data may be classified based on the spacers and determining the largest enclosing structure. For example, it may be determined whether this change included a suggested insert of a section, a table, a table row, a table column, an equation, or any other suitable structure.

In some embodiments, the HTML protocol buffer object may be generated using a templating system for dynamically generating HTML in JAVA and/or JAVASCRIPT, and may be done on the client side, the server side, or both. The templating system may have a large mapping of protocol buffer object internal values to localized human-readable values such that an internal text style property of ts_bd may get translated to Bold when rendered as HTML, for example.

The implementation of the collaborative documents may be agnostic to the different products. In particular, different products may implement different forms of HTML generation logic, such that the each product may handle the collaborative document using a product-specific implementation of the HTML generation logic.

In some embodiments, the approach may be implemented as (document model, suggestion identifier)→Commands, Mementos→Proto→HTML. In particular, by using commands as the immediate step before the proto, the revision history, change notifications, and other applications may feed commands directly into the pipeline. However, this introduces additional complexity by requiring two intermediate steps in the commands processing section. First, commands would be converted to the minimum subset that describes the change. For example, in the revision history, the change that describes insertion of the word "hello" may be represented using twenty commands in five sets of four. The first commands in each of the five set correspond to the insertion of a single letter, and the remaining three commands in each set may apply the default style to the range. In this case, logic may need to be written to aggregate these twenty commands into four commands (e.g., one command to insert "hello" and three commands to apply the style).

Second, the commands would be aggregated into a single change. Based solely on indexes and identifiers, the commands would be combined together to determine the minimum change that actually happened. For example, the list and link styles applied in the prior example are all empty, so those would be ignored, but the text style would be considered. It would also be determined that a later delete removed an earlier added and tethered entity, possibly by comparing the indexes/document slice to all added entities. This would replicate most of the logic already built into the model as well as a portion of the protocol buffer object generation for suggest changes. Additionally, even once the protocol buffer object is generated, an annotated model may still be required in the view case. In particular, the view may specifically target the revision history, while reusing the existing framework for suggest changes would mean that the process of generation of the revision history improves without additional work or labor. For these reasons, an approach that converts commands to protocol buffer objects may be more complex and difficult to maintain compared to an approach that uses suggest changes internally to handle generating a protocol buffer object.

In a third exemplary embodiment of the present disclosure, the systems and methods provide a way to resurrect trusted content via hashes. Comments and all replies to a comment may be synchronously deleted when the user elects to delete or undo the creation of the original comment. In some embodiments, only the user who originally created a comment may have permission to delete the comment. However, replies to the original comment may be created by any user, and is not restricted to the owner of the original comment. If the owner of the original comment later selects to undo a deletion of an original comment, the replies to the originally comment should be reinstated. A problem arises because the replies may have been authored by other users, and it may be undesirable for one user to be able to create replies on behalf of other users. In particular, allowing one user to generate replies on behalf of other users could potentially lead to spoofing attacks. The third exemplary embodiment of the present disclosure provides a way to recreate replies to an original comment when a user selects to undo a delete action for the original comment, without giving the user rights to create arbitrary comments or replies on behalf of other users.

Figure 4:
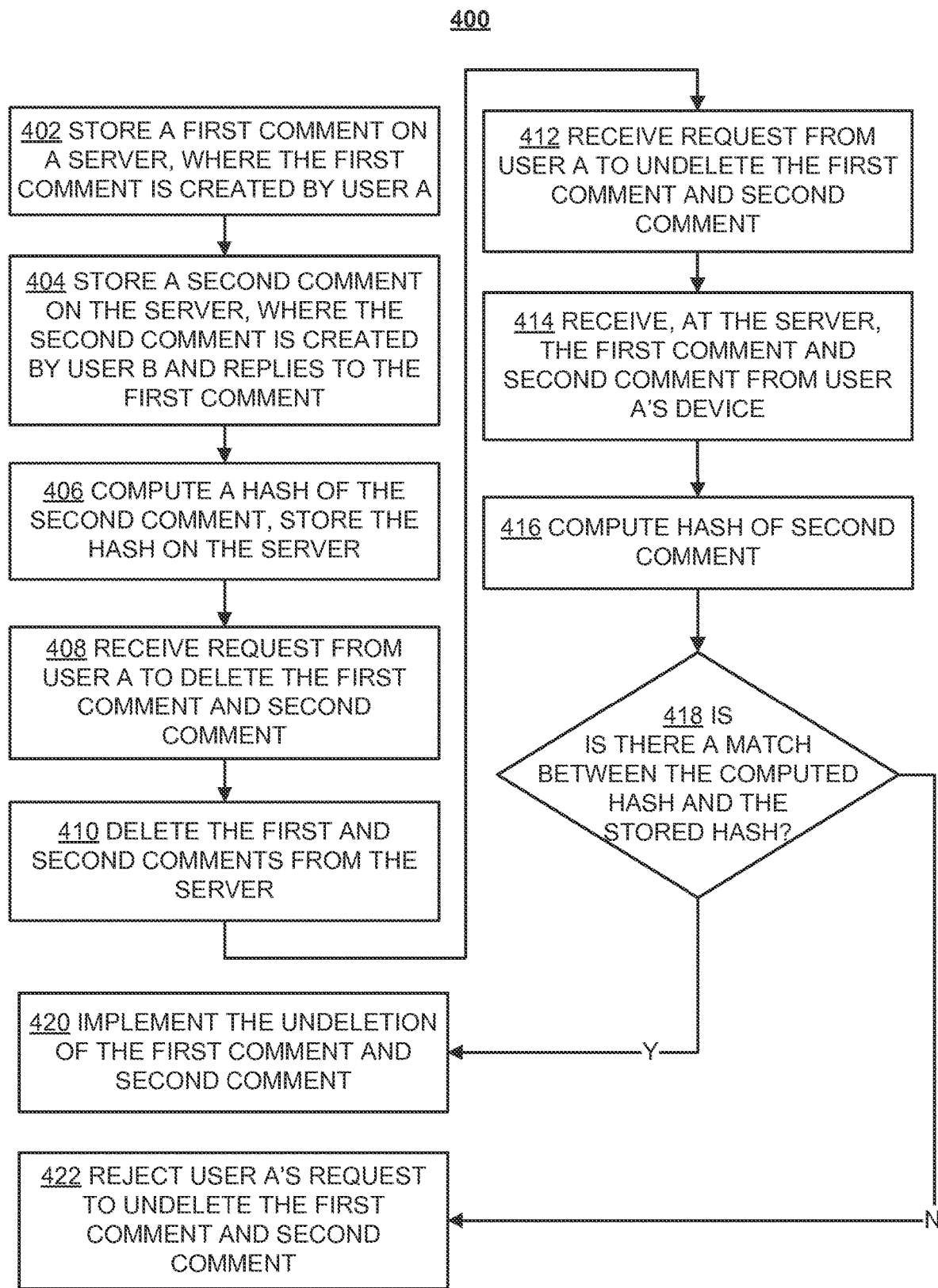
FIG. 4 is a flow chart of a method for using hash functions to determine whether to implement an undeletion, according to an illustrative implementation.

FIG. 4 is a flowchart of a method 400 used by the review manager 102 to determine whether to allow a user to undo a deletion of a comment and the comment's replies, according to an illustrative embodiment of the present disclosure. The method 400 includes the steps of storing a first comment on a server, where the first comment is created by user A and refers to an electronic document (step 402), storing a second comment on the server, where the second comment is created by user B and replies to the first comment (step 404), computing a hash of the second comment and storing the hash on the server (step 406), receiving a request from user A to delete the first comment and the second comment (step 408), deleting the first and second comments from the server (step 410), receiving a request from user A to undelete the first comment and the second comment (step 412), receiving, at the server, the first comment and second comment from user A's device (step 414), computing a hash of the second comment (step 416), and determining whether there is a match between the computed hash and the stored hash (decision block 418). If the computed hash matches the stored hash, then the undoing of the deletion of the first comment and second comment is approved and implemented in the electronic document (step 420). Otherwise, user A's request to undelete the first comment and the second comment is rejected (step 422).

At step 402, a first comment that is created by user A is received and stored on a server, which may be the server 104 described in relation to FIG. 1. As described herein, a comment may refer to a segment of text created by a user of an electronic document that is a statement on a selected portion of the electronic document. For example, a comment may reflect a user's thoughts or opinion regarding a selected portion, which may include textual content, graphical content, or any other suitable content that may be included in an electronic document. When the first comment is stored at the server at step 402, the server may store the segment of text included within the first comment, a reference to the selected portion of the electronic document that the first comment refers to, and the identity of the user who created the first comment (e.g., user A). Other data may also be stored, such as a timestamp of the time that the first comment was created, for example.

At step 404, a second comment is stored on the server, where the second comment is created by user B and replies to the first comment. As described above, to store the second comment, the server may store a segment of text included within the second comment (e.g., that include user B's thoughts or opinion on a segment of the electronic document), a reference to the selected portion of the electronic document that the second comment refers to, and the identity of the user who created the second comment (e.g., user B). In this case, because the second comment is a reply to the first comment, the selected portion of the electronic document referred to by the second comment is the first comment stored at step 402.

At step 406, the review manager 102 computes a hash of the second comment and stores the hash on the server. In particular, the third exemplary embodiment of the present disclosure includes a technique of storing a series of hashes on a server that encompass all user-settable fields (including author information). Computing the hash may include using a hash function to map the digital data included in the second comment to a value, which may be referred to as a hash.

In some implementations, more than one comment is stored at step 404. In particular, there may be multiple comments from one or more users that respond to the first comment. For example, a third comment may be created by user C that replies to the first comment or the second comment. Alternatively, the third comment may be created by user A or user B. Additional comments may be created by any user, that reply to any of the first comment, second comment, third comment, or any other comment that stems from the first comment. When more than one additional comments (e.g., in addition to the first comment) are created and stored at step 404, a hash of these additional comments is computed at step 406. The hash may include a single hash for the multiple comments, or may include individual hashes, one for each individual comment.

At step 408, the review manager 102 receives a request from user A to delete the first comment and the second comment, and the first and second comments are deleted from the server at step 410. For example, user A may have selected to only delete the first comment. Because the second comment is a reply to the first comment, it may be undesirable to allow the second comment to remain while the first comment is deleted. In this manner, it may be appropriate to determine to delete the second comment (and any other comments that stem from the first comment) when the first comment is deleted.

When an item is deleted from the server, all user-settable and/or visible information is removed from the comment, and all replies but a "tombstone" is left behind which stores the hash of the information it used to contain. In other words, the hash computed at step 406 is still stored on the server, even though the other data associated with the first and second comments is deleted from the server. While the data associated with the first and second comments is deleted from the server, such data may still be stored on user A's client device.

In some implementations, the ordering between steps 406 and 408 is switched. In particular, the hash of the second comment may be computed and stored on the server after a request is received to delete the first comment. In particular, there may be no need to compute and store the hash on the server, while the digital data corresponding to the second comment is still stored on the server. However, after the review manager 102 determines that the second comment is to be deleted, the hash of the second comment may be computed and stored before deleting the other data relating to the second comment from the server.

At step 412, the review manager 102 receives a request from user A to undo the deletion of the first comment and the second comment. In particular, user A may have deleted the first comment by mistake, and may wish to undo the deletion of the first and second comments. When user A's device transmits the request to undo the deletion to the server, user A's device may also transmit the data related to the first and second comments to the server. At step 414, the review manager 102 receives, at the server, the first comment and the second comment from user A's device. The data related to the first and second comments include any digital data used to compute the hash of the second comment at step 406. In an example, the data received at the server at step 414 may include the full contents of the first comment and all replies to the first comment (e.g., the second comment).

At step 416, the review manager 102 then computes the hash of the second comment. The server then hashes the contents of each reply. The server uses the same hash function at step 416 as was used at step 406 to compute the hash of the second comment. In particular, when there are multiple response comments to the first comment, the hash of these multiple response comments may include a single hash for the multiple comments, or may include individual hashes, one for each individual comment.

At decision block 418, the review manager 102 determines whether there is a match between the computed hash (computed at step 416, after the deletion at step 410) and the stored hash (computed and stored at step 406, before the deletion at step 410). If there is a match, then the method 400 proceeds to step 420 to implement the undeletion of the first and second comments, and to save data related to the second comment in storage. Alternatively, If there is no match, this indicates that the data that user A's device transmitted to the server at step 414 does not correspond to data that previously existed on the server. In this case, the method 400 proceeds to step 422 and rejects user A's request to undelete the first comment and the second comment. When there is one hash for each comment, and multiple comments that were responsive to the first comment, each individual hash computed based on the data received at step 414 is compared to a set of stored hashes. In this case, the method 400 proceeds to step 420 or step 422 for each individual comments.

The head comment (e.g., the first comment) may not need a hash because, to have been deleted, it had to have been owned by user A, and therefore can be edited by user A in any manner. In this way, the server and review manager 102 allow user A to create replies on behalf of another user only when that data used to exist.

In some implementations, a series of hashes is created for each reply (rather than a single, "head hash") because of collaboration. For example, a user Bob is offline and undoes deletion of a comment while another user adds or edits a reply to the comment. If only one hash is stored, then the hash of Bob's data would not match what's on the server. However, since the previous hashes for the data are stored, a match is found because the data existed on the server in that state.

One advantage of the third exemplary embodiment of the present disclosure is that it removes a need to store deleted information. This has the benefit of not only saving storage costs, but also keeps user information off of the server 104 when the information is not visible to the user. While the third exemplary embodiment of the present disclosure is related to resurrecting replies to comments in a collaborative document editing environment, one of ordinary skill in the art will understand that the present disclosure is applicable to any situation in which a user selects to undo deletion of content not authored by the user.

In accordance with the third exemplary embodiment of the present disclosure, one of three options may be selected for resolving the problem of undoing deletions of replies to comments, where the replies were generated by different users from the user who selects to undo the deletions. First, a deletion bit may be flipped for the relevant comment. In this case, instead of deleting the contents of the document, the content may be purged using an asynchronous process. Second, a hash of the contents of the deleted information may be generated, and the contents may be removed from storage. Third, the contents of the deleted information may be signed, and removed from storage. The hash method has advantages over the other two methods. In particular, the hash method is associated with lower long term resource costs than the asynchronous method, and the hash method has less complexity than the signed method.

In accordance with the asynchronous method, the content and replies may be stored, and a deleted bit is flipped to true for the discussion and all replies. These posts are treated as deleted until a client issues a change, which flips the deleted bit to false. This allows the systems and methods of the present disclosure to ensure that the discussions the client tries to restore are the same as what was originally deleted. In some embodiments, a deletion system is used to determine policies and practices for deletion of data such as user data. To comply with such a deletion system, these contents will be removed from storage one week after they are deleted. This may be done by a similar process to a tombstoning system. In particular, a tombstone may be referred to herein as a marker for data that is no longer stored at a particular location. Rather than a wholestream deletion process, the tombstoning system may consider deletion on a comment-by-comment basis. A MapReduce may be run to read all tombstones and check the tombstone date. As used herein, a MapReduce may include a system that efficiently receives, aggregates, and transmits large amounts of data from a set of sources to a centralized data store. The MapReduce may then purge all comments which have been deleted for longer than a threshold amount of time. This MapReduce may modify annotations of documents which may be open in memory.

One advantage of the asynchronous method over the hash method or the signing method is that the asynchronous method offers simplicity. Instead of clearing individual fields of each reply in a discussion, a "deleted" bit is simply set for each discussion/reply. The asynchronous method further does not require generation or storage of a hash based on the deleted fields. Moreover, there is no need to ensure that the client that deleted the post has all of the data required for the server to generate an identical hash on undelete.

Some disadvantages of the asynchronous method involve long-term maintenance costs. In particular, a new MapReduce may need to be maintained as part of the deletion system described above. Moreover, this method requires that clients that did not perform the deletion are unable to undelete. A potential solution is to use a "deleted by" field in addition to the deleted bit, to refer to the client that performs the deletion (e.g., user A in the example shown and described in relation to FIG. 4), but doing so adds to the complexity of implementing the asynchronous method. One advantage of the hash method is that it may be unnecessary to maintain a separate MapReduce job. This allows for the long term maintenance costs to be decreased.

In some implementations, when a post is deleted, if the application is still open after a predetermined period of time (such as one day, one week, one month, or any other suitable period of time) and user A undoes the deletion, the undo action fails. Moreover, a post (e.g., a comment) may be the discussion thread's head post or a reply to another post. The systems and methods of the third exemplary embodiment of the present disclosure may select to hash all posts in a discussion thread or individual posts. Dealing with individual posts may be advantageous because fewer corner cases for consideration are associated with individual posts than with discussion threads.

In some implementations, when a post is deleted, the following steps may be implemented. First, the server hashes the contents of the post and saves the contents in a new hash field. In an example, the contents and any metadata that are deleted or unchanged after the deletion may be hashed. Authorship, quote text, etc. may be hashed, while the timestamp and the deleted bit may not be hashed. Second, the server removes the contents from storage. All of the replies in a discussion may not be deleted, but their contents may be cleared so that there is something for the hashes to be associated with.

In some implementations, when a post is restored, the following steps may be implemented. First, the client device sends the post that the user proposes to restore to the server. In particular, the client device still has the post stored in its local memory. Second, the server hashes the contents of the client's proposal and matches it against the hash in storage. If the hashes match, then the post is restored.

In some implementations, complications can arise with the hash method, such as when edits or new replies are created between the time the comment was deleted and the time the server received that deletion. When using a collaborative online environment, in which changes are made and implemented in the electronic document in real time, this may be less of a problem. However, sometimes, one or more of the client devices 108, 113, and 117 may be taken offline, such that they temporarily lose connectivity with the network 120. In this case, there may be a significant time delay between a time that the comment is deleted and the time that the server receives the deletion. To resolve this, the third exemplary embodiment of the present disclosure may create a hash per Discussion/Reply and recreate only those the client knows about. Some corner cases are described below, in which user A refers to the user performing the deletion of a discussion (e.g., first and second comments in FIG. 4), and user B refers to the collaborator (e.g., the user who creates the second comment as a reply to the first comment).

In a first corner case, the discussion is deleted and undeleted from a client device while it is offline (e.g., not connected to the network 120), and the collaborator replies after the deletion but before the undeletion. First, user A goes offline and deletes discussion D. Second, user B replies to discussion D. Third, user A undeletes discussion D and goes online. When user A goes online, discussion D has not actually changed from the perspective of user A. User B's reply will be synchronized to User A.

In a second corner case, the following steps occur in the shown order: the discussion is deleted, a collaborator replies, and the discussion is undeleted. This case would be resolved in the order that the server receives the actions. If the server receives the deletion first, the reply from the collaborator would result in an error. There is no problem with restoring the discussion. If the server receives the new reply first, the deletion would delete the discussion including the new reply. In this case, User A may never see User B's reply. When User A attempts to undo the deletion, the state that User A saw will be restored, and the reply will be lost.

In a third corner case, the discussion is deleted, the collaborator modifies a reply within the discussion, and the discussion is undeleted. This case is analogous to the second corner case, in which a collaborator replies to a discussion after the discussion is deleted but before the discussion is restored.

In accordance with the sign method, instead of storing a hash of the contents of the comments, the comments may be signed using a secret key. The signature is generated only when the comment is deleted, and is sent to the client in the response. The secret key used to sign the comment may need to be synchronized across tasks. In contrast to the hash method, the sign method does not require storing a hash value on the server, but does require a potentially small change to client/server communication to send down a signature when a post is deleted.

The corner cases associated with the hash method are also applicable to the sign method. There is also an additional corner case associated with the sign method. In the additional corner case, a post is deleted and undeleted before any server response. In the usual case, if a post is deleted, the server will mark the post as deleted on the server, delete the contents, and send down a tombstone post along with the signature. In this case, the client will attempt to undelete before receiving the signature. The undelete may be queued until the delete receives the signature.

On the server-side of the design, the server that handles comments for an online collaborative document may be modified to allow owners to undelete a comment, and allow editors to undelete replies to a comment. In particular, since comments may only be deleted by the owner in the collaborative document editing application, only the owner may be allowed to restore comments on the server. This means that it may not be necessary to hash the comment, but each reply should be hashed to ensure that the owner of the comment cannot restore arbitrary content to another author's reply.

In some implementations, implementing an undo delete command on the server may involve the following steps. First, a hashCodes field is added to a data model for handling replies. Second, a hash utility function is created for creating, managing, and verifying hashes of replies. Third, there is a tombstone reply upon deletion. Fourth, a discussion stream function is updated with support for restoring deleted comments. The third and fourth steps are described in detail below. In particular, owners of comments may be allowed to undelete a comment or reply, and editors may be allowed to undelete a reply if the hash matches according to the method of FIG. 4.

In some implementations, when a reply to a comment is deleted, the reply is deleted from the comment, and no tombstone is left. When a comment is deleted, the comment is tombstoned (e.g., the contents are deleted from the comment), and all replies on the comment are deleted. To support restoring replies, this behavior may be modified. In particular, under the third step described above, a tombstone replies upon deletion. In other words, when a reply is deleted, the contents are hashed before being deleted, and the hash is saved in a tombstone reply instead of being deleted. Moreover, when a comment is deleted, each individual reply to that comment may be tombstoned. In some implementations, the contents that are deleted from the reply include the original body of the reply, the body of the reply, the users associated with the reply, and the quote. The body and the users may be determined from the original body of the reply.

In some implementations, as is described by the fourth step described above, the discussion stream is updated with support for restoring deleted comments. In particular, there may be two steps to restoring a comment. First, the comment head post is restored. Since only the owner of the comment may delete the comment head post, only the owner of the tombstoned comment may restore it. The client may send the original contents to the server. Second, each reply on the comment is restored. The user who is restoring the comment may not be the user who authored the replies. If the user is not the author, the reply that will be restored may be hashed, and the hash may be compared against its tombstone. If the user is the author, the hash check may be skipped.

In some implementations, a "hashCodes" field is added to the Reply data model in order to implement the systems and methods of the present disclosure. To do this, a List<HashCode> field may be added to Reply. The List<HashCode> field may contain the last N hashes for the comment, where N is defined by a flag. N may be greater than one to avoid a corner case that may arise with collaborative editing. In particular, with only a single hash, if user B modifies a reply and user A deletes the comment before receiving the updated reply, user A would not be able to restore the reply. In this corner case, user A only knows about the old reply that does not match the hash.

In some implementations, comments may be persisted in two ways, through support system, and/or as a file. In an example, the support system may include a metadata infrastructure that supports storage, indexing, real-time aggregation, or any suitable combination thereof. The support system may be used for user generated content and user metadata or entity metadata. The support system may support writes through partial updates and an eventual consistency model. The support system may include services that support built-in abuse integration, consumer operations support, and quality pipelines. The comments may be serialized for local storage, and may be stored as annotations in the support system. The list of hash codes may be persisted as an array of byte arrays. For the file store, this translates to a "repeated bytes hash_code" field. For the support system, this may translate to a repeated AnnotationAttribute with the name "hash_code" and only the "bytes value" field filled in.

In some implementations, a hash utility function may be used for creating, managing, and verifying comment/reply hashes. The hash utility function may be implemented as a static utility with three functions. In a first function, a hash reply function receives a reply object and generates a hash from the reply object. In a second function, a verification function receives the contents of a new reply and compares the contents of the new reply to the contents of a tombstone to verify whether there is a match with one of the hashes in the tombstone. In a third function, a rotator function adds the new hash to the list of old hashes in the tombstone, removes any duplicates in the tombstone, limits the size of the list of hashes to a fixed number of hashes (e.g., N hashes), and returns a copy of the tombstone.

In some implementations, one or more of the following fields are hashed: author gaiaid, rawQuote, originalBody, contentType, and suggestionid. In some implementations, the only field that the client is able to change is originalBody, but other fields may be hashed as well. In particular, the client may be able to change other fields, such as changing the quote text. In some implementations, metrics are gathered. These metrics may include how often the hash verification fails, or when hash verification succeeds, how far back in the list of hashes is the matching hash.

In some implementations, the following steps may be used to provide the third exemplary embodiment of the present disclosure. In one example, when a comment is deleted, the comment is hashed, its contents are deleted, and the comment is marked as deleted. Moreover, any replies to the comment are hashed, and the contents of the replies are deleted. In one example, when a comment is modified, the comment is updated, and the head post is hashed. In one example, when a comment is undeleted, each post is checked against its hash, and if there is a match, the contents of the post are restored. The contents of the head post may always be restored because there is no need to check against the hash of the head post because only the owner of the head post may delete or undelete it. In this case, the client device may mark the comment and any replies to the comment as dirty. In one example, when a comment is modified and then deleted, the comment is updated, and then deleted.

In one example, when a reply is deleted, the reply's contents are hashed and then deleted. In one example, when a reply is modified, the contents of the reply are hashed. This may be desirable because a collaborator may edit a reply, and the reply's modifications may reach another user after the user applies a delete or undelete to the comment. In this case, the contents the user sends up will hash to the reply before it was modified. For example, user B creates a comment in reply to an original comment created by user A. User A reads the comment reply made by user B. User B then modifies the content within the comment, and before user A's interface displays the modified content, user A deletes the entire comment thread. When user A undoes this deletion, the data that user A's device determines was deleted includes user A's original comment, as well as the original content of user B's reply, without his later modification. This data is sent to the server, which stores hashes of the original content of the comments as well as hashes of the modified content of the comments. In this case, the server identifies that the newly computed hash matches the hash of the original content and allows the original content to be restored, i.e., user A's original comment and the original content of user B's reply, without his modification. In one example, when a reply is undeleted and the user who requested the undelete is the owner of the reply, the contents of the reply may be restored without any checks or hashes. In one example, when a reply is undeleted and the user who requested the undelete is not the owner of the reply, the contents of the reply are hashed and restored only if the computed hash matches the stored hash. In one example, when a reply is undeleted, a client device may mark the undeleted reply as dirty. On the client device, the contents of an existing comment may not be cleared when the server sends down a deleted comment.

In a fourth exemplary embodiment of the present disclosure, the systems and methods provide a way to unify an undo (and redo) stack for a document model. One problem that arises is when edits, such as comments or suggestions are made and an undo or redo operation is selected by one or more document users. Managing the undo and/or redo comments for a document may be accomplished by unifying two separate applications such that the two applications share an undo/redo stack. This can be for the purpose of, for example, embedding one application inside of another and having one central undo/redo stack for both applications and models. Actions affecting either model can be performed from the other application, and there may be a central manager that is capable of handling all undo/redo operations for both applications. Accordingly, a communication mechanism and unification of undo/redo stacks between multiple disparate models and applications is described herein. One way to do this is by making one application responsible for the undo/redo stack and all actions are proxied through that application.

Having a unified undo/redo stack between multiple applications may be desirable such that if the user provides an undo or redo command, the last change made to any application sharing the undo/redo stack is undone or redone, regardless of which application is currently selected (e.g., was last selected by a user). The application that is responsible for the undo/redo stack may be referred to herein as the host (or primary application), and the other application may be referred to herein as the secondary application.

In one example, the secondary application is embedded within the host application, such as a spreadsheet application embedded within a document application. In this case, the spreadsheet application and the document application share a unified undo/redo stack that may include changes from both the spreadsheet application and the document application. If the user provides an input indicative of a desire to undo or redo a change, the change is undone or redone for the latest change in the stack, which may be for either the spreadsheet application or the document application. For example, if the user last made a change in the spreadsheet application but is currently selected within the document application when he provides the undo or redo command, the change in the spreadsheet application is undone or redone. Similarly, if the user last made a change in the document application but is currently selected within the spreadsheet application when he provides the undo or redo command, the change in the document application is undone or redone.

In another example, the user may drag a portion of text from the document application and releases the portion of text into the spreadsheet application. In this case, the unified undo/redo stack may recognize this drag and drop operation as a single action across two applications. If the user selects to undo this operation, then not only is the portion of text removed from the spreadsheet application, but the portion of text is also added back to the document application.

In an example, the fourth exemplary embodiment of the present disclosure is applied to two models: a document model and a comment model. In particular, if a user inserts suggested text into a document, the document model recognizes the insertion as a suggested insertion and marks the insertion accordingly. Moreover, the comment model creates a new comment object to associate with the suggestion. In this case, the single action of insertion caused a change to be made to each model. Because the document model and the comment model share a unified undo/redo stack, undoing the insertion would cause both changes to be undone.

Specifically, the document model may mark the suggested insertion as deleted, and the comment model may mark the comment object as deleted.

Figure 5:
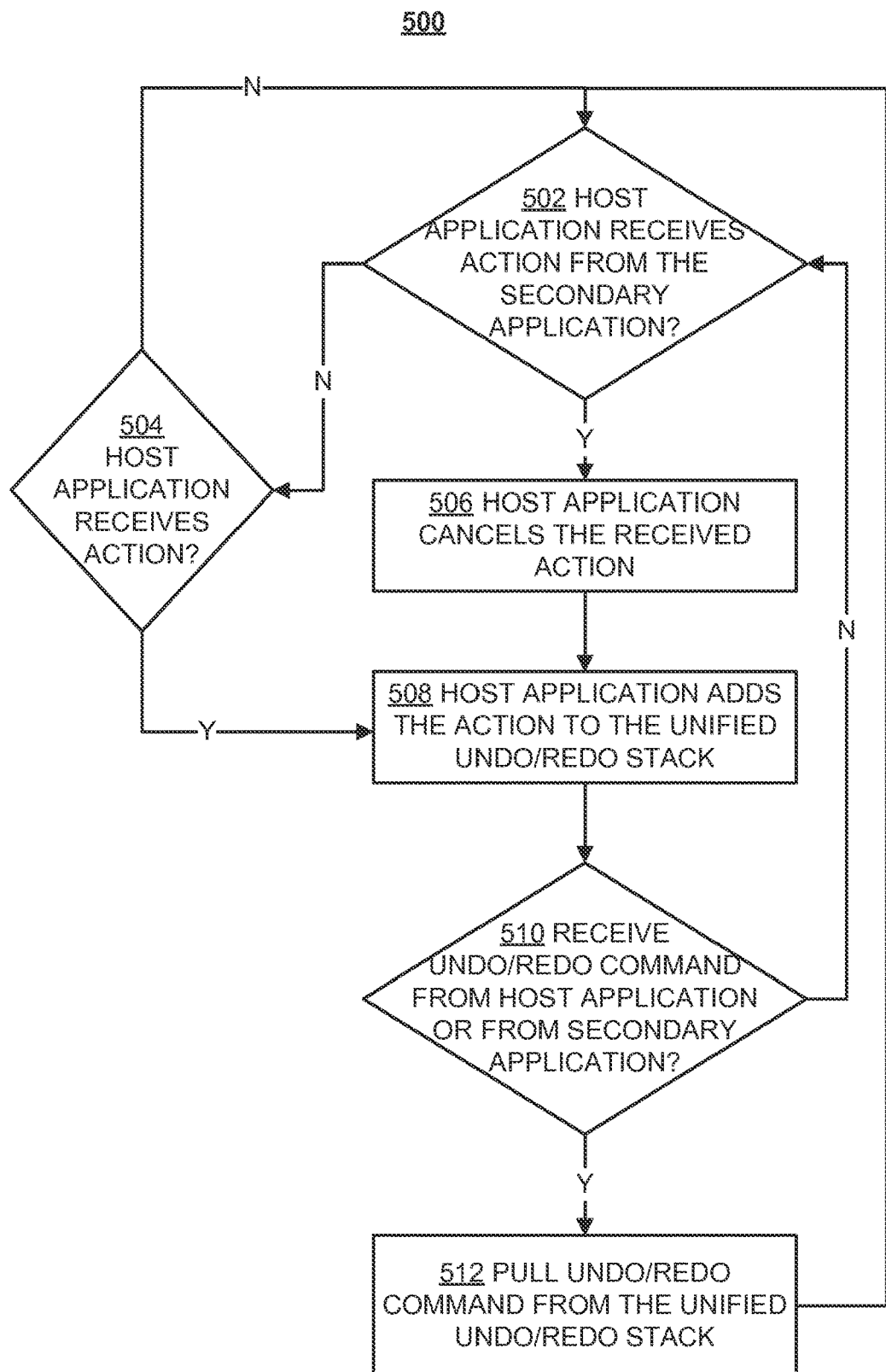
FIG. 5 is a flow chart of a method for implementing a unified undo/redo stack across multiple application models, according to an illustrative implementation.

FIG. 5 is a flowchart of a method 500 used by the review manager 102 to implement a unified undo/redo stack that is shared between a host application and a secondary application. The method 500 includes the steps of the review manager 102 determining whether the host application receives an action from the secondary application (decision block 502), and if so, the host application canceling the received action (step 506). Alternatively, the review manager 102 determines whether the host application receives an action directly (decision block 504). The host application adds the action (either directly received at the host application at decision block 504, or received at the host application via the secondary application at decision block 502) to a unified undo/redo stack (step 508). The review manager 102 determines whether an undo/redo command is received from the host application or from the secondary application (decision block 510), and if so, the undo/redo command is pulled from the unified undo/redo stack (step 512).

At decision block 502, the review manager 102 determines whether the host application receives an action from the secondary application. For example, a user may interact with the secondary application, and that interaction is signaled to the host application via an event. If the host application receives an action from the secondary application, the method 500 proceeds to step 506, at which the host cancels the action or event from the secondary application such that the action or event is not implemented within the host application.

At step 508, the host application adds the action to the unified undo/redo stack. For example, the host application may trigger the action via a usual mechanism that the host application would normally use. For example, the mechanism may involve an API call to the secondary application as a discrete step. That discrete step, similarly to all other user interactions triggered from the host application, may implicitly add the information to the undo/redo stack.

Alternatively, if the review manager 102 determines at decision block 502 that the host application has not received an action from the secondary application, the review manager 102 proceeds to decision block 504 to determine whether the host application has directly received an action. In particular, the user may interact with the host application, and that interaction may result in the triggering of an action from the host application. In this case, there is no event from the secondary application and therefore no need to cancel anything at step 506. When the user interacts directly with the host application, the review manager 102 proceeds to step 508, so that the action is added to the unified undo/redo stack.

At decision block 510, the review manager 102 determines whether an undo/redo command is received from the host application or from the secondary application. At step 512, the undo/redo command is pulled from the unified undo/redo stack. If the undo/redo command refers to an action that took place within the host application, the host application is able to implement the undo/redo command directly. Alternatively, if the undo/redo command refers to an action that took place within the secondary application, the host application transmits a command that triggers the undo/redo action in the secondary application. In particular, the secondary application may include as part of its API an inverse of every action. In this case, the host application may be able to trigger that inverse as the undo action to every other action.

Some advantages of the fourth exemplary embodiment of the present disclosure are that the embedded or secondary application only needs one exposed path or API to trigger any given action. One application (e.g., the host application) is responsible for all undo/redo actions and there is no state synchronization needed between applications/models. In some implementations of the present disclosure, the undo/redo stack may be synchronized between the host application and the secondary application. This may be implemented using a counter. However, the counter approach may be unnecessarily burdensome and may lead to other challenges in implementing a collaborative environment.

There are several ways for a document comment to be deleted. In a first way, a user may create a suggestion by making a suggested edit to the document (e.g., by modifying some text into the document), and then providing an input that indicates a request to undo the suggestion. In a second way, the user may select to delete a comment in a stream view, e.g., deleting the comment directly via a user interface for the comment section. In a third way, a collaborator deletes a comment, and the deletion is synchronized to another user's device.

Figure 6:
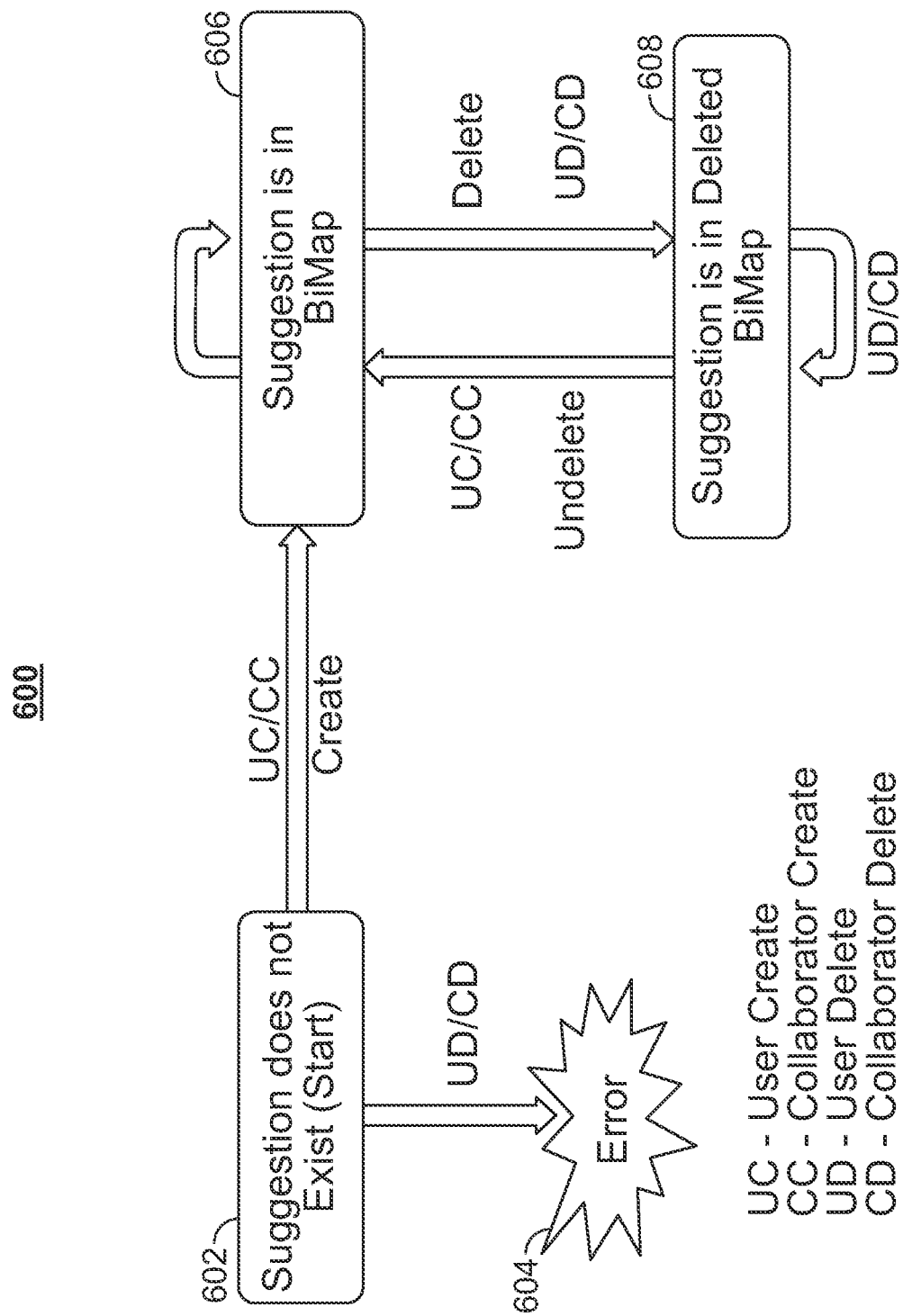
FIG. 6 is a state diagram of a system for allowing users and collaborators to create and delete suggestions, according to an illustrative implementation.
Figure 7:
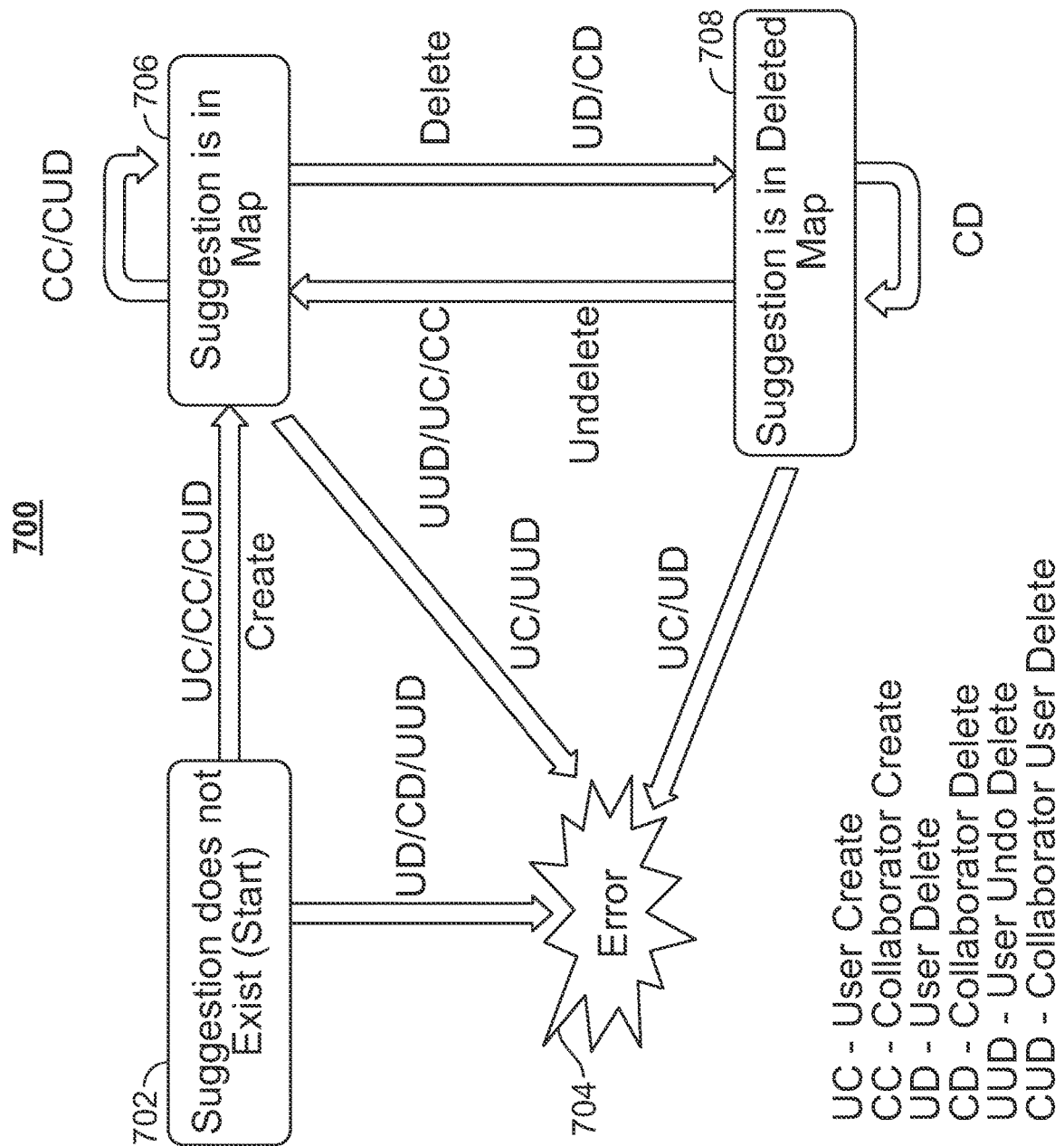
FIG. 7 is a state diagram of a system for allowing users and collaborators to create, delete, and undo deletion of suggestions, according to an illustrative implementation.

FIGS. 6 and 7 depict state transition diagrams 600 and 700 that provide for possible interactions between user actions and collaborator actions with regards to deleting comments or suggestions and undoing deletion of comments or suggestions. In particular, the state diagram 600 includes four states 602, 604, 606, and 608. At state 602, a suggestion does not exist. If a user or collaborator attempts to delete a suggestion that does not exist, the system enters the error state 604. Alternatively, when a user or collaborator creates a suggestion, the system enters the state 606, in which the suggestion is in BiMap, which may correspond to a two-way map between a handle and an anchor id, and may include a list of undeleted suggestions or comments. As the user or collaborator create additional suggestions, these suggestions are added to the list. When the user or collaborator delete a suggestion, the system enters the state 608, in which the suggestion to be deleted is added to a Deleted BiMap, which may correspond to a list of deleted suggestions or comments. As suggestions are undeleted, they are moved from the list of deleted suggestions to the list of undeleted suggestions as the system transitions from state 608 to state 606. The step from state 608 returning to state 608 occurs because the collaboration may occur asynchronously. In particular, two different users may delete something concurrently on their separate user devices. When the user devices are synchronized, it may appear as if the same deletion occurred twice, or once by each user.

In another example, the state diagram 700 includes four states 702, 704, 706, and 708. At state 702, a suggestion does not exist. If a user or collaborator attempts to delete a suggestion that does not exist, or if a user attempts to undo a deletion of a suggestion that does not exist, the system enters the error state 704. Alternatively, when a user or collaborator creates a suggestion, or when a collaborator undoes a deletion of a suggestion, a suggestion is created and the system enters the state 706, in which the suggestion is in a map between list of undeleted suggestions or comments. As the collaborator creates additional suggestions or undoes a deletion of suggestions, these suggestions are added to the list. When the user or collaborator deletes a suggestion, the system enters the state 708, in which the suggestion to be deleted is added to a Deleted Map, which may correspond to a list of deleted suggestions or comments. The loop exiting and returning to the state 706 and to the state 708 results from asynchronous collaboration, as described in relation to FIG. 6. As suggestions are undeleted by the user undoing a deletion, the user creating a suggestion, or by the collaborator creating a suggestion, the undeleted or created suggestions are moved from the list of deleted suggestions to the list of undeleted suggestions as the system transitions from state 708 to state 706. Moreover, the system errors at state 704 when a user creates or undoes a deletion of a suggestion from the state 706, or when the user creates or deletes a suggestion from the state 708.

In one example of a method to undo a suggestion or comment, a delete comments function and an undo delete comments function are generated to undo and redo deletions in a document. Another method may orphan comments instead of deleting the comments, by removing any link between the comment and any other entity within the document, for example. The logic on a client device may then properly undelete a comment and notify the host application, so that the host application may position the comment in a proper location within the document.

In another example of a method to undo a suggestion or comment, a delete suggestion command may be implemented to behave as an inverse of a create suggestion command. A delete comment function may be exposed to a comments API adapter, and a new suggestion function may be modified to conditionally call an undo delete comment function if the corresponding comment already exists.

In one example of a method to delete a comment in a stream, when a delete comment action is received, an event is sent from the commenting system to the host application of the user's intent to delete the comment. This notification event is sent before the deletion occurs, and the host application is allowed to cancel the deletion and run its own logic instead. In another example, existing commands related to creating and deleting suggestions may be reused for creating and deleting comments. Separate maps may be maintained for existing and deleted comments. A new function for deleting a comment may be created and inverted to generate a create comment function. Moreover, the delete comment command may be used to trigger deletion. Comments may be anchored to certain locations within the document. When a comment is deleted, the method may remove the anchor for the comment to be deleted, before that comment is deleted. This way, the method ensures that the anchor does not get left behind after its corresponding comment is deleted.

In some implementations, the fourth exemplary embodiment of the present disclosure is integrated with an existing collaborative document editing system. In order to integrate use of a unified undo/redo stack across multiple applications, several steps may be performed. Commands, appliers, and inverters may be created for every action that can be done in commenting with a collaborative document. All undoable commenting on the collaborative document interactions may use these commands, appliers, and inverters. These commands may use a no-operation transformer, and they may correspond to metadata commands such that they would not be serialized, and would rather use an error serializer.

There may be some advantages of this approach. For example, there may be no need for special hooks or special commands to perform undoing or redoing of certain actions. Existing edits that use the API for commenting on a collaborative document are streamlined and cleaned up. Moreover, this approach allows for the use of command events to respond to changes in commenting on a collaborative document, rather than the current commenting on collaborative document-specific API events. In some implementations, some commands may be modified to properly handle a mix of metadata and regular commands.

In some implementations, one or more of the following commands may be used to implement the fourth exemplary embodiment of the present disclosure. A create suggestion command may be used to create new suggestions. A delete suggestion command may be used to delete an existing suggestion. Another command may set a quote, which may include a textual description of the suggestion, for a suggestion. Moreover, commands may be created to accept a suggestion, reject a suggestion, or delete a suggestion reply.

In some implementations, one or more of the following appliers may be used to implement the fourth exemplary embodiment of the present disclosure. All appliers may have a collaborative document API adapter passed into their constructor, and mementos may be null. In particular, appliers may be used with a create suggestion command, a delete suggestion command, a set suggestion quote command, an accept suggestion command, a rejected suggestion command, and/or a delete suggestion reply command. To delete a suggestion, the delete suggestion command applier may call a comment API adapter to delete the comment and add the suggestion id or the handle of the comment to a map of deleted suggestions.

Since a suggestion may already have been created and then undone (deleted) and then redone (re-created), it may be desirable to resurrect the original discussion thread associated with that suggestion. That discussion thread may have replies authored by other authors and cannot be created from the current client. As such, creating a suggestion may require undeleting a previously deleted suggestion rather than creating a new one. To facilitate this, the collaborative document API adapter may maintain a map of collaborative document handles which were deleted during this editing session. The flow of the applier may look as follows. First, a suggestion id is retrieved from a create suggestion command. Then the collaborative document API adapter is queried to determine if the suggestion id has been deleted. If so, then the suggestion is undeleted. Otherwise, then a new suggestion is created.

In one example of creating a suggestion, a command may involve:

CreateSuggestion("sId"), SetQuote("sId", "INSERT a") where "sId" corresponds to a suggestion id of the suggestion. The corresponding undo command may involve:

UNDO: SetQuote("sId", getQuote("sId")), DeleteSuggestion("sId")

In another example of adding text to a suggestion, a command may include:

COMMAND: SetQuote("sId", "INSERT abc")

The corresponding undo command may involve:

SetQuote("sId", getQuote("sId"))

In another example of accepting a suggestion, a command may include:

COMMAND: AcceptSuggestionCommand("sId")

The corresponding undo command may involve:

UNDO: DeleteAcceptSuggestionCommand("sId")

Moreover, an API for the collaborative document environment may involve the following additions:
1. deleteComment(handle), which deletes the comment or suggestions having the given handle
2. undeleteComment 3. setQuote(handle, quote), which sets the quote of the comment associated with the given handle to quote
4. createReply(handle, ReplyType), which creates a reply to the given handle of the specified type While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method comprising:
   determining that a host application receives an action regarding a document, wherein the action comprises a user change made to the document via the host application;
   adding the action regarding the document to a unified stack that is associated with undo commands and is shared between the host application and a secondary application, wherein at least a portion of the document is editable via the host application and the secondary application;
   receiving an undo command from the secondary application; and
   retrieving the undo command from the unified stack to cause the user change made to the document via the host application to be undone in the secondary application.

2. The method of claim 1 further comprising:
   determining that the host application receives a second action regarding the document;
   adding the second action to a unified stack that is associated with redo commands and is shared between the host application and the secondary application;
   receiving a redo command from the host application or the secondary application; and
   retrieving the redo command from the unified stack to cause the second action to be redone in at least one of the host application or the secondary application.

3. The method of claim 2 wherein the unified stack associated with the undo commands is the same as the unified stack associated with the redo commands.

4. The method of claim 1 wherein the secondary application is embedded within the host application.

5. The method of claim 1 wherein the host application is a document application and the secondary application is a spreadsheet application.

6. The method of claim 1 wherein the action pertains to adding text to the document or adding a comment to the document.

7. The method of claim 6 wherein the undo command regarding the comment corresponds to one of: user input indicating a request to undo a suggested edit to the document, user input indicating a request to delete the comment via a user interface for a comment section, or user input indicating a request to delete the comment and synchronize the deletion with another user device.

8. The method of claim 1 wherein determining that the host application receives the action pertaining to the document comprises:
   determining whether the host application receives the action from the secondary application or directly; and responsive to determining that the host application receives the action from the secondary application, canceling the action from the second application.

9. The method of claim 1 wherein determining that the host application receives the action pertaining to the document further comprises:
determining whether the host application receives the action from the secondary application or directly; and
responsive to determining that the host application receives the action directly, refraining from canceling the action from the second application.

10. The method of claim 1 wherein the unified stack is synchronized between the host application and the secondary application.

11. Non-transitory computer-readable media having recorded thereon instructions, that when executed by one or more computer processors, perform operations comprising:
determining that a host application receives an action regarding a document, wherein the action comprises a user change made to the document via the host application;
adding the action regarding the document to a unified stack that is associated with undo commands and is shared between the host application and a secondary application, wherein at least a portion of the document is editable via the first host application and the secondary application;
receiving an undo command from the secondary application; and
retrieving the undo command from the unified stack to cause the user change made to the document via the host application to be undone in the secondary application.

12. The non-transitory computer-readable media of claim 11 wherein the operations further comprise:
determining that the host application receives a second action regarding the document;
adding the second action to a unified stack that is associated with redo commands and is shared between the host application and the secondary application;
receiving a redo command from the host application or the secondary application; and
retrieving the redo command from the unified stack to cause the second action to be redone in at least one of the host application or the secondary application.

13. The non-transitory computer-readable media of claim 11 wherein the secondary application is embedded within the host application, and wherein the host application is a document application and the secondary application is a spreadsheet application.

14. The non-transitory computer-readable media of claim 11 wherein the action pertains to adding a comment to the document, and wherein the undo command regarding the comment corresponds to one of: user input indicating a request to undo a suggested edit to the document, user input indicating a request to delete the comment via a user interface for a comment section, or user input indicating a request to delete the comment and synchronize the deletion with another user device.

15. The non-transitory computer-readable media of claim 11 wherein determining that the host application receives the action pertaining to the document comprises:
determining whether the host application receives the action from the secondary application or directly; and
responsive to determining that the host application receives the action from the secondary application, canceling the action from the second application.

16. The non-transitory computer-readable media of claim 11 wherein determining that the host application receives the action pertaining to the document further comprises:
determining whether the host application receives the action from the secondary application or directly; and
responsive to determining that the host application receives the action directly, refraining from canceling the action from the second application.

17. A system comprising:
a memory; and
one or more processors, coupled to the memory, to perform operations comprising:
determining that a host application receives an action regarding a document, wherein the action comprises a user change made to the document via the host application;
adding the action regarding the document to a unified stack that is associated with undo commands and is shared between the host application and a secondary application, wherein at least a portion of the document is editable via the first host application and the secondary application;
receiving an undo command from the secondary application; and
retrieving the undo command from the unified stack to cause the user change made to the document via the host application to be undone in the secondary application.

18. The system of claim 17 wherein the operations further comprise:
determining that the host application receives a second action regarding the document;
adding the second action to a unified stack that is associated with redo commands and is shared between the host application and the secondary application;
receiving a redo command from the host application or the secondary application; and
retrieving the redo command from the unified stack to cause the second action to be redone in at least one of the host application or the secondary application.

19. The system of claim 17 wherein the secondary application is embedded within the host application, and wherein the host application is a document application and the secondary application is a spreadsheet application.

20. The system of claim 17 wherein the action pertains to adding a comment to the document, and wherein the undo command regarding the comment corresponds to one of: user input indicating a request to undo a suggested edit to the document, user input indicating a request to delete the comment via a user interface for a comment section, or user input indicating a request to delete the comment and synchronize the deletion with another user device.

21. The system of claim 17 wherein determining that the host application receives the action pertaining to the document comprises:
determining whether the host application receives the action from the secondary application or directly; and
responsive to determining that the host application receives the action from the secondary application, canceling the action from the second application.

22. The system of claim 17 wherein determining that the host application receives the action pertaining to the document further comprises:
determining whether the host application receives the action from the secondary application or directly; and responsive to determining that the host application receives the action directly, refraining from canceling the action from the second application.

\* \* \* \* \*